April 28, 1931. F. D. WARBURTON 1,803,287
SHOCK ABSORBER
Filed July 8, 1929 2 Sheets-Sheet 1
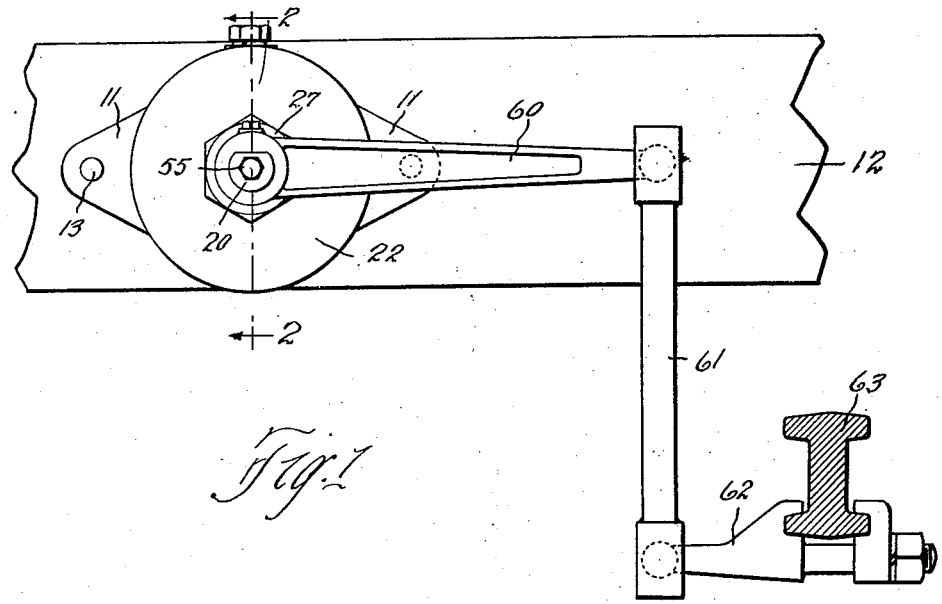
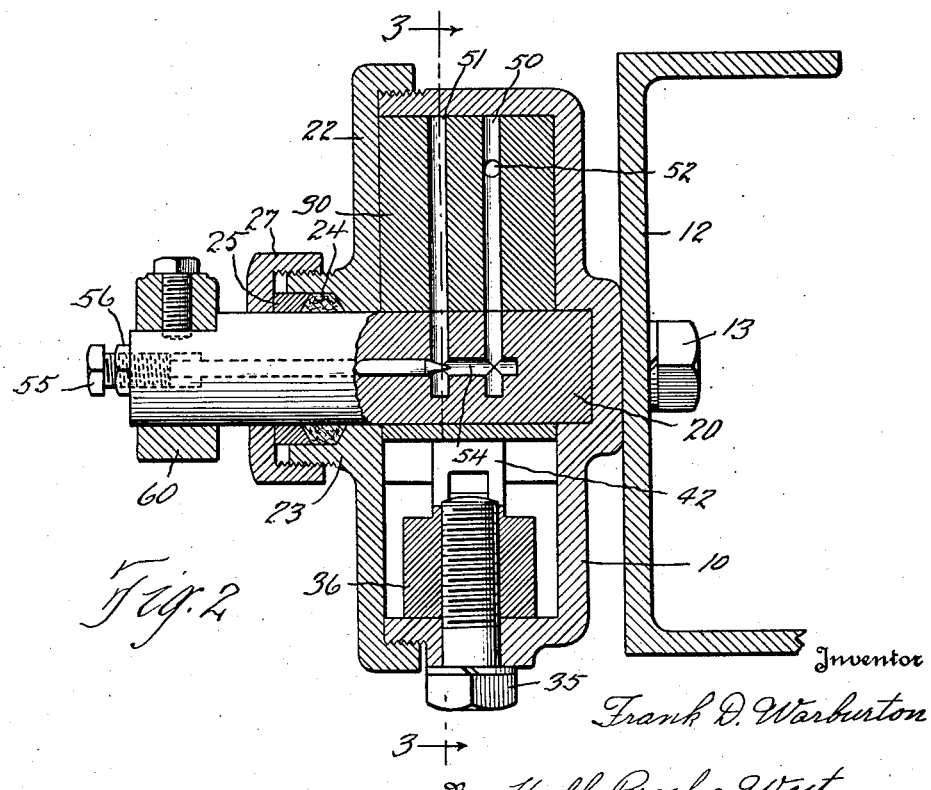
Inventor
Frank D. Warburton
By Hull, Brock & West
Attorneys

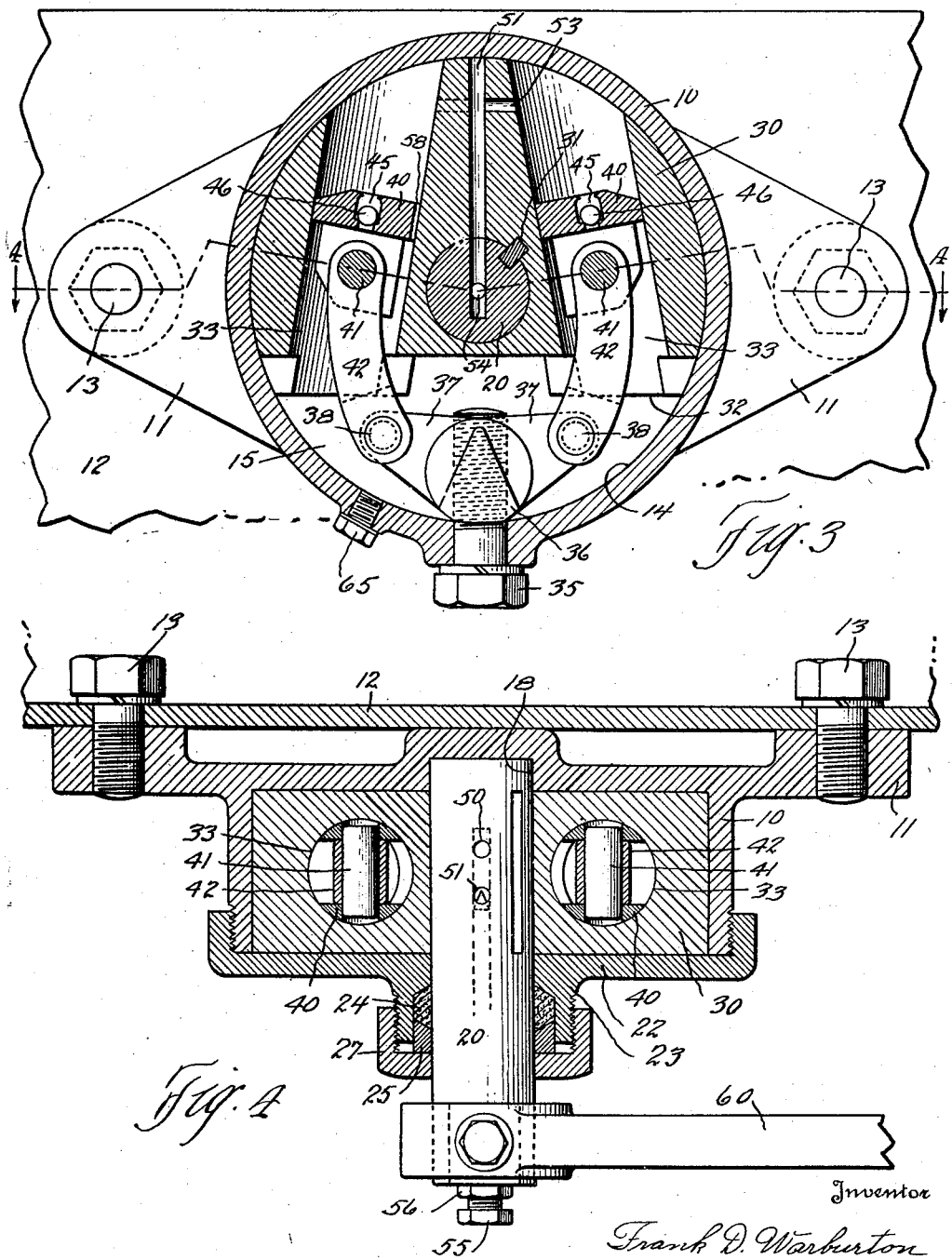

Patented Apr. 28, 1931

1,803,287

UNITED STATES PATENT OFFICE

FRANK D. WARBURTON, OF CLEVELAND, OHIO, ASSIGNOR OF ONE-FOURTH TO ROBB O. BARTHOLOMEW, OF CLEVELAND HEIGHTS, OHIO, AND ONE-FOURTH TO DAVID BROPHY, OF LAKEWOOD, OHIO

SHOCK ABSORBER

Application filed July 8, 1929. Serial No. 376,550.

This invention relates to improvements in shock absorbers and particularly to an improved double acting shock absorber of the hydraulic type.

The object of the invention is to provide a shock absorber of the type commonly referred to as hydraulic, which has relatively few moving parts, which is positive in its action and reliable in its operation.

A more specific object is to provide a shock absorber having an oscillating block provided with bores which constitute cylinders in which fluid is trapped and forced from one cylinder to the other through restricted passages by pistons which operate therein.

Still further objects are to provide check valves to permit the fluid to flow into the cylinders during the outward stroke of the pistons; to provide a passage in one piston permitting a flow of the fluid from one side to the other to allow easier movement of the oscillating block in one direction than in the other when desired.

In the drawings which form a part of this specification, Fig. 1 is a side elevation of the shock absorber showing its connection with the frame and axle of an automobile; Fig. 2 is a vertical section through the shock absorber and vehicle frame taken on the line 3—3 of Fig. 2; and Fig. 4 is a horizontal sectional view on the line 4—4 of Fig. 3.

In describing my invention reference is made to the accompanying drawings wherein like reference numerals are used to indicate like parts in the several views. The device illustrated, in which my invention is embodied, comprises a casing 10 with laterally extending apertured lugs 11 by which it may be secured to a vehicle frame 12 with bolts or screws 13. The casing has a cylindrical chamber 14 extending in from one end, the bottom wall 15 of the chamber being provided with a recess 18 concentric therewith, in which one end of a shaft 20 is journaled. The outer end of the casing is externally threaded for the reception of a cap or cover plate 22 which is tightly screwed thereon. Centrally the plate 22 is provided with an apertured boss 23 through which the outer end of the shaft 20 extends, the boss being counterbored to provide a stuffing box for the reception of packing 24, which is held in place in the box by the packing gland 25 and threaded cap 27 which screws onto the boss 23.

Closely fitting within the walls of the chamber 14 is an oscillating block 30 secured non-rotatably to the shaft 20 by the key 31. The block 30 is cylindrical in form with one flat side 32, and is provided with two bores 33 which extend therethrough from the flat side in a common plane but are inclined toward each other at the side of the block opposite the flat side.

Secured in the casing 10 below the flat side of the block 30 by a screw 35 is an anchor member 36 with oppositely extending arms 37 apertured to receive pivot pins 38. Positioned in each bore or cylinder 33 in the block 30 is a piston 40, secured by means of a wrist pin 41 to one end of a connecting rod or link 42, the opposite end of which is secured to the anchor member 36 by the pins 38.

Through the head of each piston 40 is a passage 45 in which is a valve seat and ball 46 cooperating therewith to close the passage when the pistons move upwardly in the cylinders, while permitting a flow of fluid therethrough when the piston is moved in the opposite direction.

Extending radially outwardly from the center of the shaft 20 and through the block 30 between the bores 33 are two passages 50 and 51. Near the outer end a transverse passage 52 provides communication between one bore or cylinder 33 and the passage 50, and a second passage 53 provides communication between the second bore or cylinder and the passage 51. A passage 54 extending axially from the outer end of the shaft 20 connects the passages 50 and 51 at their inner ends.

Screw threaded into the outer enlarged end of the passage 54 is the shoulder portion of a needle valve 55, the point of which extends into the passage 51 so that by screwing the valve in or out the flow of the fluid through the passages 50—51 may be controlled. A lock nut 56 is provided for securely locking the valve 55 in its adjusted position.

One piston head 40 is provided with a groove 58 on its outer periphery to permit the flow of fluid thereby when the piston moves in either direction relative to the cylinder for the purpose explained hereinafter.

To the outer end of the arm 20 is secured by means of a set screw an arm 60, the outer end of which is attached by a pivoted link 61 and clamp 62 to the axle 63 of the vehicle on which the shock absorber is installed.

The casing 10, with the block 30, pistons etc., in place is filled with a non-congealing liquid. The cylinders 33 and all passages in the block 30 are completely filled, so that any relative movement of the pistons and block is resisted by the liquid which must pass through either the openings 52—53, 45 or 58, depending on the direction in which the block is rotated.

With the casing 10 and arm 60 secured to the frame and axle of a vehicle the relative movement of these parts as the springs of the vehicle flex is cushioned. When the springs flex there is an oscillation of the block 30 in the casing 10 and as the block oscillates there is, of course, relative reciprocation of the pistons 40 therein. During the upward stroke of each piston the fluid above it in the cylinder 33 is displaced through the ports 52 or 53 and 50, 51 past the needle valve in the passage 54. By adjusting the valve 55 the speed at which the fluid may escape from the cylinder and hence the speed of oscillation of the block for any given force may be controlled.

When it is desired that the rebound of the spring should not be cushioned to the same extent as the downward movement or vice versa, the piston 40 which is on its upward stroke at that particular time may be provided with an opening such as 58 to permit some of the fluid to pass by the piston thereby relieving the pressure in that cylinder somewhat and permitting more rapid oscillation of the block 30 in the one direction.

A filler opening normally closed by the plug 65 is provided in the casing 10 through which additional liquid may be supplied when necessary.

While I have illustrated the shock absorber in the position with the pistons extending upwardly, I contemplate mounting the same on the frame with the anchor block up, as illustrated in Fig. 1. In this position the injection of additional liquid is made easier, and the cylinders are always full even if there is not sufficient liquid to completely fill the casing.

In some cases one or both of the check valves 46 may be dispensed with, and the passages 45 made smaller to act as bleeder openings permitting a restricted flow of the fluid in both directions therethrough.

While I have illustrated one form of device in which my invention may be embodied, it is obvious that various changes in construction may be made without departing from the spirit of the invention or the scope of the appended claims.

Having thus described my invention, what I claim is:

1. In a device of the class described, a casing provided with a chamber, a block mounted for relative oscillatory movement in said chamber, said block having a pair of bores therein, pistons pivotally mounted to said casing and fitting within said bores, said block having passages whereby fluid may be forced from one bore to the other as said block is oscillated.

2. In a device of the class described, a casing provided with a chamber, a block mounted for relative oscillatory movement in said chamber, said block having a pair of bores therein, pistons pivotally mounted to said casing and fitting within said bores, said block having passages whereby fluid may be forced from one bore to the other as said block is oscillated, and means for controlling the rate of flow of the fluid from one bore to the other.

3. In a device of the class described, a casing provided with a chamber, a block mounted for relative oscillatory movement in said chamber, said block having a pair of bores therein, pistons pivotally mounted to said casing and fitting within said bores, said block having passages whereby fluid may be forced from one bore to the other as said block is oscillated, said pistons having openings provided with check valves permitting the flow of fluid into the bores when the block is oscillated in one direction.

4. In a device of the class described, a casing provided with a chamber, a block mounted for relative oscillatory movement in said chamber, said block having a pair of bores therein, pistons pivotally mounted to said casing and fitting within said bores, said block having passages whereby fluid may be forced from one bore to the other as said block is oscillated, said pistons having openings provided with check valves permitting the flow of fluid into the bores when the block is oscillated in one direction, and means for controlling the rate of flow of the fluid from one bore to the other.

5. In a device of the class described, a casing provided with a chamber, a block mounted for relative oscillatory movement in said chamber, said block having a bore therein, a piston in said bore and pivotally connected to said casing, the chamber comprising a reservoir for a liquid, said block being provided with passages through which the liquid from the bore is forced when the block is rotated in one direction causing relative motion of the piston in the bore, and a check valve permitting the flow of liquid into the bore when the block is rotated in the opposite direction.

6. In a device of the class described, a casing provided with a chamber, a block mounted for relative oscillatory movement in said chamber, said block having a bore therein, a piston in said bore and pivotally connected to said casing, the chamber comprising a reservoir for a liquid, said block being provided with passages through which the liquid from the bore is forced when the block is rotated in one direction causing relative motion of the piston in the bore, a check valve permitting the flow of liquid into the bore when the block is rotated in the opposite direction, and means for controlling the rate of flow of the fluid from the bore through said passages.

7. In a device of the class described, a casing having a substantially cylindrical chamber therein, a block member pivotally mounted and fitting snugly in said chamber, cylinders in said block, pistons in said cylinders and connected to said casing, a shaft extending from said block through said casing, an arm on said shaft, said casing and cylinders being adapted to be filled with a liquid against which the pistons operate, said block having a passage providing communication between said cylinders at their closed ends, and a valve in said passage whereby the rate of flow of the liquid may be regulated, check valves permitting liquid to flow into the cylinders when the block is revolved in a direction imparting a relative outward movement of each piston in its respective cylinder.

8. In a device of the class described, a casing having a substantially cylindrical chamber therein, a block member pivotally mounted and fitting snugly in said chamber, cylinders in said block, pistons in said cylinders, an anchor member secured in said casing to which the pistons are connected, means for rotating said block to cause relative reciprocation of the pistons in said cylinders, conduits connecting the cylinders whereby liquid may be forced directly from one to the other when said block is oscillated, and check valves in the pistons whereby liquid may flow into each cylinder on the outward stroke relative to that cylinder.

9. In a device of the character described, a casing provided with a chamber, a block mounted for relative oscillatory movement in said chamber, said block having a bore therein, a piston pivotally mounted on said casing and fitting within said bore, said block having a passageway communicating with said bore whereby fluid may be forced from said bore as said block is oscillated.

In testimony whereof, I hereunto affix my signature.

FRANK D. WARBURTON.